US009052892B2

(12) United States Patent
Ristic et al.

(10) Patent No.: US 9,052,892 B2
(45) Date of Patent: Jun. 9, 2015

(54) POWER SUPPLY MANAGEMENT INTEGRATED CIRCUIT

(75) Inventors: Sasa Ristic, Graz (AT); InSun Van Loo, Wijchen (NL); Patrick E. G. Smeets, Weert (NL)

(73) Assignee: Ericsson Modems, SA, Plan-les-Ouates (CH)

( * ) Notice: Subject to any disclaimer, the term of this patent is extended or adjusted under 35 U.S.C. 154(b) by 1122 days.

(21) Appl. No.: 12/451,891

(22) PCT Filed: May 27, 2008

(86) PCT No.: PCT/IB2008/052078
§ 371 (c)(1),
(2), (4) Date: Jun. 1, 2010

(87) PCT Pub. No.: WO2008/149257
PCT Pub. Date: Dec. 11, 2008

(65) Prior Publication Data
US 2010/0250974 A1    Sep. 30, 2010

(30) Foreign Application Priority Data
Jun. 4, 2007  (EP) .................................... 07109505

(51) Int. Cl.
*G06F 1/26* (2006.01)
*G06F 1/32* (2006.01)

(52) U.S. Cl.
CPC ............ *G06F 1/3203* (2013.01); *G06F 1/3246* (2013.01); *G06F 1/329* (2013.01); *Y02B 60/144* (2013.01); *Y02B 60/32* (2013.01)

(58) Field of Classification Search
CPC .......... G06F 1/26; G06F 1/263; G06F 1/3206
USPC ................................................ 713/300, 320
See application file for complete search history.

(56) References Cited

U.S. PATENT DOCUMENTS

| 5,732,281 A | * | 3/1998 | Summers et al. ................. 710/8 |
| 5,784,627 A | * | 7/1998 | MacDonald .................. 713/300 |
| 6,140,714 A | | 10/2000 | Fujii |
| 6,232,893 B1 | * | 5/2001 | Cliff et al. ........................ 341/78 |
| 7,026,840 B1 | * | 4/2006 | May et al. ........................ 326/38 |
| 7,131,018 B2 | | 10/2006 | Ueda et al. |

(Continued)

FOREIGN PATENT DOCUMENTS

| EP | 1 596 270 A1 | 11/2005 |
| JP | H04-355810 A | 12/1992 |

(Continued)

OTHER PUBLICATIONS

International Search Report dated Nov. 16, 2009 in connection with PCT Patent Application No. PCT/IB2008/052078.

(Continued)

*Primary Examiner* — Chun Cao
(74) *Attorney, Agent, or Firm* — Coats and Bennett, PLLC

(57) ABSTRACT

A power management integrated circuit comprises a plurality of power source circuits power received at a power supply input terminal to supply power to a plurality of power supply output terminals. A plurality of power source circuits is coupled between the power supply input terminal and the respective power supply output terminals. The power management integrated circuit comprises an active configuration memory and a communication interface with at least one terminal for uploading configuration data from outside the power management integrated circuit into the configuration memory. A control circuit controls operating parameters of respective ones of the power source circuits dependent on the configuration data from the active configuration memory. Thus, the power management integrated circuit is able to switch between different power supply states in a dynamically configurable way, without requiring external control over the configuration during switching.

16 Claims, 5 Drawing Sheets

(56) References Cited

U.S. PATENT DOCUMENTS

| | | | |
|---|---|---|---|
| 7,463,057 B1 * | 12/2008 | Rahim et al. | 326/38 |
| 7,567,060 B1 * | 7/2009 | Atcitty et al. | 320/116 |
| 7,624,295 B2 | 11/2009 | Taketoshi et al. | |
| 7,673,163 B2 | 3/2010 | Tsukimori et al. | |
| 7,800,400 B2 * | 9/2010 | Rahim et al. | 326/38 |
| 7,859,301 B2 * | 12/2010 | Vest et al. | 326/37 |
| 2003/0030326 A1 | 2/2003 | Shenai et al. | |
| 2003/0204757 A1 | 10/2003 | Flynn | |
| 2004/0025065 A1 | 2/2004 | Lou | |
| 2005/0017965 A1 | 1/2005 | Morita et al. | |
| 2007/0101174 A1 | 5/2007 | Tsukimori et al. | |

FOREIGN PATENT DOCUMENTS

| | | | |
|---|---|---|---|
| JP | 2002132397 A | 5/2002 | |
| JP | 2002268471 A | 9/2002 | |
| JP | 2003114742 A | 4/2003 | |
| JP | 2004140503 A | 5/2004 | |
| JP | 2005043435 A | 2/2005 | |
| JP | 2005128937 A | 5/2005 | |
| JP | 2007122437 A | 5/2007 | |

OTHER PUBLICATIONS

Written Opinion of the International Searching Authority dated Nov. 16, 2009 in connection with PCT Patent Application No. PCT/IB2008/052078.

"Power Management IC for Li-Ion Powered Systems TPS65021", Oct. 2005, Texas Instruments, 45 pages.

"Single-Cell Li-Ion Battery-And Power-Management IC TPS65800", Feb. 2007, Texas Instruments, 98 pages.

"Dialog Semiconductor launches integrated power management controller", Dialog Semiconductor, Sep. 22, 2005, 2 pages.

* cited by examiner

POWER SUPPLY MANAGEMENT INTEGRATED CIRCUIT

CROSS-REFERENCE TO RELATED APPLICATION(S)

The present application claims priority under 35 U.S.C. §365 to International Patent Application No. PCT/IB2008/052078 filed May 27, 2008, entitled "POWER SUPPLY MANAGEMENT INTEGRATED CIRCUIT". International Patent Application No. PCT/IB2008/052078 claims priority under 35 U.S.C. §365 and/or 35 U.S.C. §119(a) to European Patent Application No. 07109505.3 filed Jun. 4, 2007 and which are incorporated herein by reference into the present disclosure as if fully set forth herein.

FIELD OF THE INVENTION

The invention relates to power management in electronic circuits and to a power management integrated circuit for use in an electronic circuit.

BACKGROUND OF THE INVENTION

U.S. Pat. No. 5,469,553 describes an electronic circuit wherein power consumption is managed using a power state machine. This circuit comprises a plurality of components that can each be switched to different states, such as a reset state, a sleep state, an idle state and an active state, wherein they consume different levels of power (and have different operating capability). U.S. Pat. No. 5,469,553 provides a microprocessor and a program memory with a program to make the microprocessor support a power state machine that controls the components to switch to their different states in accordance to a state of the power state machine. In response to internal and external events the microprocessor executes event-handling programs that switch the power state machine between its different states, with the effect that the components of the circuit are switched to respective states accordingly.

Nowadays hand-held devices (HHD) have very dynamic functionality upgrades. In order to retain high system efficiency and to maximize battery life, as well as to meet stricter printed board size requirements by using high-level system integration, development of advanced and highly integrated solutions for power supply generation and battery management becomes crucial.

SUMMARY OF THE INVENTION

Among others, it is an object to enable flexible and efficient control of power consumption in an integrated circuit.

The invention is defined by the independent claims. Dependent claims describe advantageous embodiments. It is provided a power management integrated circuit according to claim 1. This integrated circuit may be used in an apparatus where it supplies power supply voltages to different circuits of the apparatus via different power output terminals of the power management integrated circuit. In an embodiment, regulated power supply source circuits may be used in the power management integrated circuit to supply different power supply voltages to different power output terminals. The power management integrated circuit controls operating parameters for the output terminals dependent configuration data from an active configuration memory in the power management integrated circuit. The power management integrated circuit has a communication interface for uploading the configuration data into the power management integrated circuit from the integrated circuit. In this way a flexible response to changing power supply requirements can be realized with very little power consumption. In an embodiment the configuration data can be dynamically uploaded after start-up of the apparatus, or even during operation of the apparatus, for example when new functions are installed in the apparatus.

The configuration data may define a voltage level output at a first one of the power supply output terminals by a first one the power source circuits. The configuration data may define respective voltage levels output at respective ones of the power supply output terminals by a respective ones of the regulated power source circuits. The configuration data may define timing delays between switch off and/or switch on of respective ones of the regulated power source circuits. The configuration data may define a definition of a power supply response to detection of a specified event. Specified events may for example be trigger signals at direct power control inputs of the power management integrated circuit, the configuration data defining for example timing delays between switch off and/or switch on of respective ones of the regulated power source circuits in response to the trigger signals from a first one of the direct power control terminals, or a combination of regulated power source circuits that will be switched off and/or switched on in response to the trigger signal from the first one of the direct power control terminals.

In an embodiment the power management integrated circuit comprises a default configuration memory, for supplying default configuration data before configuration data has been loaded into the active configuration memory. Thus, for example, a minimum response can be provided, sufficient to power a circuit that can upload the configuration data.

The power management integrated circuit may be organized as a hierarchy of power supply domains. In this case use of the configuration data may be activated for example only once a domain at a specific lower level in the hierarchy has been powered.

The power management integrated circuit may operate as a state machine. In this case, the configuration data may be used to control parameters used in different ones of the states (e.g. voltages output in a state), insertion of additional states and/or timing of switching between the states.

In an embodiment the power management integrated circuit supports an active state and a hibernate state, i.e. a state entered upon detection of a lack of activity, wherein reduced power is supplied in readiness for switching to the active state to prevent that certain start-up actions will be needed before switch back to the active state. In this embodiment the configuration data controls with of the power supply output terminals supply output power in the hibernate state. In a further embodiment the power supply voltage level at these terminals may be set dependent on the configuration data. The power may for example be supplied selectively only to a memory or memories that store instructions of programs such as a login program.

In an embodiment the power supply management integrated circuit has power inputs for a primary supply source and a secondary supply source and the power management integrated circuit is configured to switch to a backup state upon detection of disconnection of the primary power source. In this embodiment, the configuration data controls which part of the power management integrated circuit and/or the power supply output terminals receive power from the secondary supply source in the backup state.

BRIEF DESCRIPTION OF THE DRAWINGS

These and other objects and advantages will become apparent from a description of exemplary embodiments, using the following Figures.

DETAILED DESCRIPTION OF EMBODIMENTS

Figure 1:
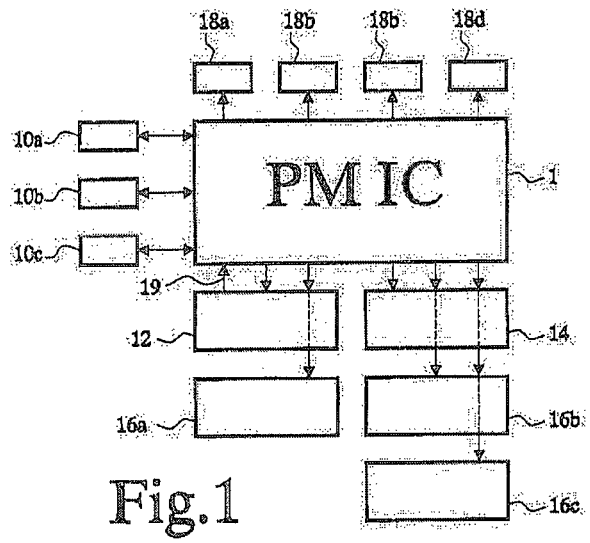
FIG. 1. shows a circuit with a power management IC (PM IC)

FIG. 1 shows a circuit with a power management integrated circuit 1 (PM IC). The circuit comprises a plurality of power sources 10a-c, an application processor 12, a communication processor 14, interface units 16a-c, and specific function units 18a-d. Only power supply connections are shown, with the exception of a control signal connection 19 coupled from application processor 12 to the PM IC. The PM IC has power inputs coupled to power sources 10a-c and power outputs coupled to power supply inputs of application processor 12, communication processor 14 and specific function units 18a-d. Application processor 12 and communication processor 14 comprise circuits for forwarding power supply to interface units 16a-c.

By way of example a circuit of a hand held device (HHD) will be discussed. Also by way of example, the interface units 16a-c may include a Bluetooth interface for wireless communication, a GPS or DVB interface (for position determination or television signal reception) and a media player, e.g. a sound or video output device. Specific function units 18a-d may include a mechanical vibration generator for signaling a silent alarm, a lamp for backlighting, a smart card and a memory. Thus a cellular telephone may be realized, with optional features like a media player, a bluetooth interface, a WLAN interface and/or GPS. The specific functions of these features are not relevant from the state-machine operation.

By way of example, the power sources 10a-c may include a main battery, a back-up battery and a battery charger. The PM IC may be configured to supply charging power to the main battery and/or the back-up battery, in addition to receiving input from the main battery and a back-up battery at other times. In operation the PM IC receives its primary power supply from the main battery. In an embodiment a power selector switch is provided that allows the battery charger to be used to draw power supply current to the PM IC, when the battery charger is connected. The Back-up Battery may be provided as a secondary (low power) supply source. This source usually has small capacity, and is used to maintain some basic in-house resources, for example a real-time clock within the PM IC.

In an embodiment the PM IC is configured to regulate both the main battery- and back-up battery charging process. As soon as the internal references and supplies are available and fulfil given quality level, the PM IC may react on user-interface requests, by providing permanent power supply selected connected blocks, and a permanent and controlled (switched and/or regulated) power supply for the application processor 12.

In order to enable an efficient energy usage, the application processor 12 supports a number of separate power domains, to which it power supply has to be supplied depending on functionality required, i.e. on the application running in the moment of use. For each power domain, the PM IC has a respective regulated power source (RPS) output terminal. By way of example nine such external power supply outputs are shown. The PM IC performs basic switching on and off and regulation of these sources autonomously. For the application processor 12 PCMC may provide a power supply terminal with a more advanced control and regulation. When the power supply voltage at a power supply output terminal is equal to the input power supply voltage, an on/off switch may be used as a power supply source circuit between the power supply input terminal and that power supply output terminal, instead of a regulated power supply. Similarly, a common regulated supply may be used in combination with a plurality of switches to supply a power supply voltage at the same level to selectable ones of a plurality of power supply output terminals.

Figure 2:
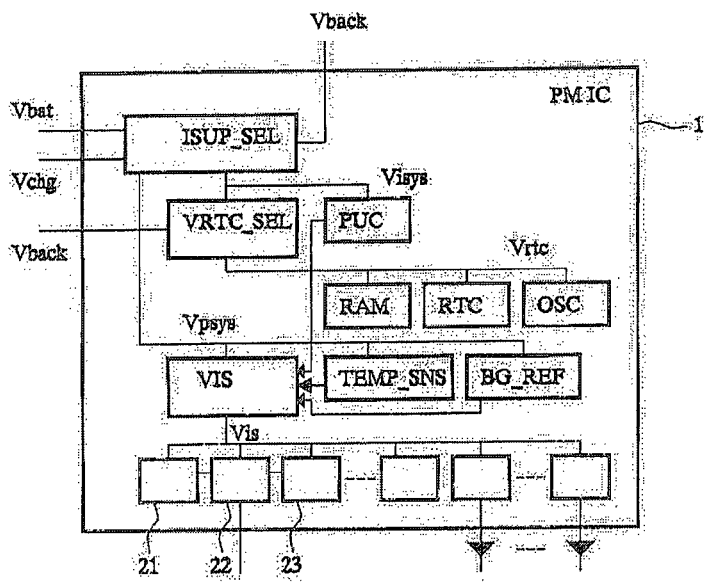
FIG. 2 shows a power domain stack within a PM IC

FIG. 2 shows a functional diagram of the PM IC. By way of example four power domains are illustrated, called Visys, Vrtc, Vpsys, and Vis. Conceptually, these domains are stacked from Visys down to Vis. Increasingly lower levels in the stack are activated depending on external and internal conditioned signals.

An ISUP_SEL block generates input supply voltages for the Visys and Vpsys domains. The ISUP_SEL block can take its supply from a power supply inpit terminal 26 for the main battery voltage, Vbat, or the main charger, Vchg, depending on their availability. Default primary source is the main battery. The Visys power supply voltage is delivered to a power-up control block (PUC), and to a VRTC_SEL block for generating the power supply voltage of the Vrtc domain. The PUC block generates a PowerUp signal when it detects one of a number of activating signals, and holds this signal 'high' while required to do so by a control signal from the Vis control circuit domain.

The VRTC_SEL block generates the input supply for the Vrtc domain from the Visys and Vback voltages, depending on their availability. In an embodiment using CMOS technology, a typical power supply current needed by the PUC is 10 uA. With other functions, the complete current budget for Visys domain is around 12-13 uA. Within the PM IC, Visys is the only available supply when the PM IC is waiting for a user start-up action, and at least one of primary sources is available. On the level of PM IC, this state is identified and later described as OFFPM state.

The power supply voltage from the Vrtc domain is supplied to an oscillator circuit (OSC), real-time clock (RTC), for example 32-bit UNIX timer, and RAM memory for keeping internal system integrity flags (RAM). By default the VRTC_SEL block derives Vtrc from Visys. When the primary supply (Vbat or Vchg) is missing, the VRTC_SEL block can derive Vrtc from the back-up battery, Vback. Total current consumption of Vrtc domain blocks may be about 2-3 uA in CMOS technology. When Vrtc is supplied by Vback, only limited activities of RTC and flag-keeping memory (RAM) are available, and this power domain could be identified as special PM IC off-state—OFFBACK.

The ISUP_SEL block supplies supply voltage to the Vpsys domain blocks when triggered by a PowerUp signal. The power input from a primary source is conditioned for this purpose. A block TEMP_SNS is powered by Vpsys to check die temperature threshold. BG_REF is supplied to generate the band-gap voltage reference. A block VIS is an internal voltage supply regulator. Vpsys domain is expected to have typical current consumption below 1 mA when none of the external units supplied by Vis domain, are enabled yet. Since this represents a temporary PM IC status during which are all necessary conditions for activation verified, the Vpsys power domain can be assigned to the state described later as VALIDATE.

The internal voltage supply regulator (VIS) supplies power to other internal blocks and to RPS blocks 28 supplying power supply output to external power supply output terminals 29 of the PM IC. By way of example two RPS blocks 28 are shown. A different number may be used, typically a larger number. The internal blocks include a default configuration memory 21, a configuration controller 22 and an active configuration memory 23.

Figure 2A:
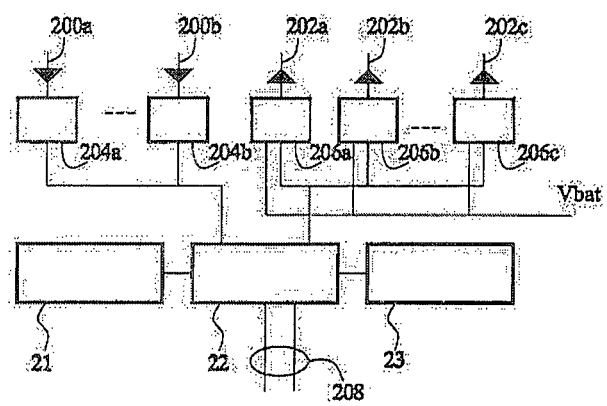
FIG. 2a shows a part of a PM IC
FIG. 3. PM IC control state-machine
FIG. 4 RPS control state-machine
FIG. 5 Timing diagrams for: Start-up-event, Go-hib event, and Shut-down event
FIG. 6. Configuration settings for the main feature facilities in PM IC
FIG. 7 Vrtc supply selection

FIG. 2a shows a part of the PM IC in more detail. This part comprises default configuration memory 21, configuration controller 22, active configuration memory 23, RPS blocks 206a-c and direct control circuits 204a,b. A number of external integrated circuit terminals of the PM IC are shown, including direct power control terminals 200a,b, power output terminals 202a-c, and external terminals of a standard interface 208. Each direct control circuits 204a,b has an input coupled to a respective one of the direct power control terminals 200a,b. Each RPS block 206a-c has an output to a respective one of the power output terminals 200a-c. Configuration controller 22 is coupled to standard interface 208, to default configuration memory 21 and to active configuration memory 23. Furthermore, configuration controller 22 has interfaces to RPS blocks 206a-c and direct control circuits 204a,b. Default configuration memory 21 may be a non-volatile multiple-, or one-time programmable memory. Active configuration memory 23 may be of any writable type, for example a volatile memory. Active configuration memory 23 may comprise a memory matrix, in which configuration data can be accessed by means of addressing, or active configuration memory 23 may comprise registers that are permanently connected to respective circuits such as RPS blocks 206a-c, so that configuration data may be read without addressing.

The control functions of default configuration memory 21, configuration controller 22, active configuration memory 23, RPS blocks 206a-c and direct control circuits 204a,b. are powered by Vis (not shown). In addition RPS blocks 206a-c are coupled to the battery voltage input of the PM IC (Vbat), optionally via a circuit (not shown) that selects between Vbat and a power voltage derived from the charger input of the PM IC. Although two direct control circuits 204a,b and three RPS blocks 206a-c with corresponding external terminals are shown, it should be appreciated that different numbers of such circuits, with corresponding external integrated circuit terminals may be used. The direct control circuits 204a,b are optional. In another embodiment of the PM IC these are not present.

In operation, RPS blocks 206a-c convert the battery voltage (or a voltage derived from the battery charger) to respective power supply voltages at external power output terminals 202a-c, when commanded to do so. In an embodiment configuration controller 22 supplies commands to the RPS blocks 206a-c to control whether they will supply power supply voltage to the power output terminals 202a-c and optionally at what voltage level. In the embodiment wherein direct power control circuits 204a,b are used, these direct control circuits receive direct control signals from direct power control terminals 200a,b and cause the RPS blocks 206a-c to be controlled in response to these direct control signals. In an embodiment direct power control circuits 204a,b signal reception of direct control signals to configuration controller 22, which responds by generating control signals for RPS blocks 206a-c. In an alternative embodiment direct power control circuits 204a,b may be configured to provide control signals to RPS blocks 206a,c directly.

Operational aspects of the PM IC are controlled by configuration controller 22 from within the PM IC. The operational aspects may include one or more of voltage levels that the RPS blocks 206a-c are set to realize at the power output terminals 202a-c, timing delays between switch off and/or switch on of different RPS blocks 206a-c etc. In the embodiment wherein the PM IC has one or more direct power control terminals 200a,b the operational aspects controlled by configuration controller 22 may include definitions to responses to the direct-control signals at the direct power control terminals 200a,b, such as respective selections of RPS blocks 206a-c that will be switched on or off in response to the direct power control signals at respective ones of the direct power control terminals, or combinations of voltages in to be supplied in response to direct power control signals.

Configuration data defining these operational aspects is stored in active configuration memory 23, from where it is used to control the RPS blocks 206a-c. In an embodiment configuration controller 22 may be configured to read configuration data from active configuration memory 23 and to program the configuration data into the RPS blocks, for example via an internal bus or via individual connections to respective ones of the RPS blocks. In another embodiment this may be realized by coupling cells of the active configuration memory 23 directly control inputs of respective ones of the RPS blocks 206a-c.

In an embodiment wherein direct power control terminals 200a,b are used, configuration controller 22 may configured to read the configuration data from configuration memory 23 and to control the control circuits according to de configuration data in response to the direct power control signals. In another embodiment, the direct power control circuits 204a,b may be coupled control operation of the RPS blocks 206a-c directly In this case the direct power control circuits 204a,b may be configured to read configuration data from active configuration memory 23 and to control the RPS blocks dependent on the configuration data.

When no configuration data has been stored in active configuration memory 23, configuration controller 22 loads default configuration data from default configuration memory 21. In an embodiment configuration controller 22 copies the default configuration data to active configuration memory 23 for further use to control the RPS blocks 206a-c. Alternatively, configuration controller 22 may be configured to control operation from default configuration memory 21 as long as it detects that no configuration data is yet stored in active configuration memory 23.

Configuration controller 22 is configured to receive configuration data updates from standard interface 208, for example from application processor 12. The same lines of the standard interface are shared to receive updates for configuration data for all RPS blocks 206a-c. By way of example, an I2C bus may be used as standard interface 208. In the following these terminals will be referred to as the standard interface. When configuration controller 22 receives configuration data updates, it writes the updates to active configuration memory 23, for further use to control the RPS blocks.

Compared to direct control of the operational aspects from outside the integrated circuit, e.g. by the application processor 12, control from within the PM IC via active configuration memory 23 has the advantage that power consumption is reduced because no configuration data needs to be supplied from outside the PMIC each time when the power supplies are switched on or off. Use of a programmable active configuration memory 23 for this purpose has the advantage that these operational aspects can be dynamically changed, for example dependent on software updates in the application processor, or other components of the circuit of FIG. 1 to add new functions or to modify old functions, or when new or modified components are connected to the circuit of FIG. 1.

In an embodiment the configuration data is uploaded into active configuration memory 23 from outside the PM IC each time when the circuit is powered up. In another embodiment, a non-volatile configuration memory 23 is used, so that previously uploaded configuration data can be used on power up. Default configuration memory 21 may be a read only memory, comprising factory defined (e.g. mask programmed) default configuration data. Alternatively, default configuration memory 21 may be programmable, the PM IC providing for in-circuit programming of the default configuration data. Thus, for example the default configuration data could be programmed by application processor 12 via standard interface 208 to define an initial default response. Furthermore, a programmable default configuration memory 21 may be combined with a factory-defined circuit that provides default parameters until default configuration memory 21 has been programmed.

The internal supply regulator (VIS) is enabled when the reference voltage reaches a predetermined expected level, when die temperature is below the safety threshold, and when PowerUp signal requires it. Having this domain regulated, better performances and characteristics can be granted, the most important—to the RPS blocks. VIS is assigned to the system's active states where interface with the application processor is enabled as well. In further text there will be two states described in details, ACTIVE and HIBERNATE. In addition a back-up battery charger (not shown), may also be provided, receiving power for its control circuit from the Vis domain, to supply current from the battery charger input to the batteries.

Table 1 shows power domains versus state- and external power source availability. All HHD facilities, like extern supply regulators that are assigned to ACTIVE or HIBERNATE states, make use of a regulated internal supply powered by Vis, and, eventually, the primary battery supply, i.e. Vbat.

Each transition has priority level assigned by a number. The priority level determines the order of checking the conditions: The smaller number of the priority level—the higher priority for that state-transition.

In more detail, the states are describes as follows:
NOPOWER 31—Whenever is PM IC not supplied by any supply source, this situation is known as a no-power state.
OFFPM 34—If a primary source voltage is detected, this is followed by the activation of a limited PM IC's internal power domain named Visys. Without further conditioning of Visys, this situation is recognized as OFFPM state.
OFFBACK 30—When a limited secondary source is available only, a limited internal power domain is activated—Vrtc. This domain is meant for certain resident activities, like real-time clock operation and system-status flag holding. Vrtc is available in all other states as well with an exception of NOPOWER. A difference is only that in OFFBACK, the back-up battery source is selected for Vrtc, and in the other states Vrtc is originated from a primary energy source, i.e. concretely from the Visys source.
VALIDATE 35 0—From the available power sources point of view, this state takes place in order to validate primary internal supply-, die-temperature, and reference conditions. Validation is triggered when a start-up event is detected. Three parallel validations make sure that system activation is reliable and robust against illegal PM IC conditions. Three conditions to be satisfied, represented by flags in FIG. 2, are: Vpsysok, Tempok, and Vrefok. While any of validation flags is low, and the start-up event is pending, system is in the VALIDATE state.
ACTIVE state 32—An arbitrarily selectable HHD-system activity is possible when PM IC state-machine is in the ACTIVE state only. Another important property of state ACTIVE is the available internal regulated power domain, Vis, which supplies all RPSs of the HHD system. Vis can be considered available after the triple validation mentioned above. A third property of the ACTIVE state is that it represents a complex state-machine that employs configuration and performs control over the PM IC's RPSs. This state-machine will be addressed in more details later.

TABLE 1

Power domain status versus PM IC states and supply sources' status

| PM IC Power Domain | NOPOWER | OFFBACK | OFFPM | VALIDATE | ACTIVE/HIBERNATE |
|---|---|---|---|---|---|
| Vrtc | No | Yes | Yes | Yes | Yes |
| Visys | No | No | Yes | Yes | Yes |
| Vpsys | No | No | No | Yes | Yes |
| Vis | No | No | No | No | Yes |

Figure 3:
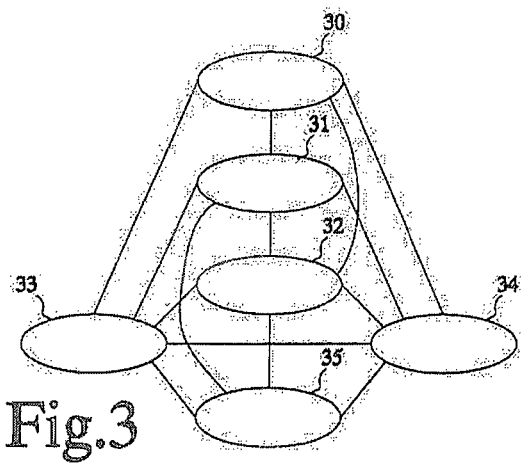

FIG. 3 shows states 30, 31, 32, 33, 34 and 35 of a state-machine that reflects internal PM IC activity and a selection of possible transitions between the states. The names of the states, and the power supply conditions under which the states are valid are OFFBACK 30 (back-up energy source available), NOPOWER 31 (no energy source available), ACTIVE 32 (valid primary energy source available), HIBERNATE 33 (valid primary energy source available), OFFPM 34 (primary energy source available) and VALIDATE 35 (primary energy source available). As long as the condition mentioned in brackets for a state is valid, and no external events being detected, the state machine remains in that state. Transitions between states represent processed/validated external events.

HIBERNATE 33—HIBERNATE is a state defined by a valid primary source, i.e. Vis domain available, and also on an application software request. It is also characterized by a number of RPS's available. Which RPS's will be available and/or what power supply voltage level they will supply is a matter of configuration defined by configuration data that was stored in the active configuration memory, for example under control by application software executed by the application processor, while system was in the ACTIVE state. This state is mentioned to perform a configurable low-power profile for the whole HHD system by selecting not only the necessary RPS's, but also reset signals and clock references for HHD. The HIBERNATE state and the corresponding configuration of the PM IC can be used to swap time-efficiently between complete ACTIVE state configuration and HIBERNATE state configuration, by means of one standard-interface command of the application processor.

The implementation wherein the activity of RPS's in the HIBERNATE state is set according to configuration data in the active configuration memory, makes it possible to swap between different HIBERNATE configurations by updating the configuration data with a command sent via the standard interface. During state switching the defined low-power HIBERNATE system state is then effected by the PM IC hardware. This may result in a faster boot-up of the application software on the transition back to ACTIVE, for example, when the configuration defines that a power supply is kept active to which a memory is connected, wherein selected computer program routines are stored (a login routine, a pin entry routine, etc. . . . ). Thus, the application processor may be arranged to use the update of configuration data to ensure that these routines need not be loaded first after leaving the HIBERNATE state.

HIBERNATE and ACTIVE states are known per se. As used herein, in a ACTIVE state the circuits connected to the power management integrated circuit may perform specific application tasks, such as user initiated tasks. As in a hibernating animal, in a HIBERNATE state generally, the external circuits are kept only partly active, in readiness for switching to the active state. As used herein the hibernate state refers to a state wherein power is supplied that prevents that it will be necessary to perform certain start-up actions that would be needed for switching to the active state from a state wherein no power is supplied to the external circuits and that is entered upon a detection of a lack of activity. In a HIBERNATE state generally the external circuits are not able to perform the specific functions, for example because no or insufficient power is supplied to keep processors running.

Transitions between the states are defined dependent on signal conditions. The following transitions may be used:

All sources gone transitions—transition triggered by the situation when neither primary—nor secondary source is detected anymore. This transition takes place to the NOPOWER state from any other state. All sources gone has the highest priority (priority level 1), i.e. it overrules all other possible transitions.

Any primary source inserted transitions—transitions triggered by either battery- or main charger detection. It takes place between the NOPOWER and OFFPM states. Any primary source inserted is processed with the highest priority check (priority level 1).

Any primary source gone transitions—transitions triggered either by battery- or main charger removed whilst none of them remains detected, i.e. at the last primary source removed. This transition takes place between ACTIVE, OFFPM, or HIBERNATE on one side, and OFFBACK—on the other side Any primary source gone—is processed with the second highest priority check (level 2).

Valid back-up source inserted transition—transition triggered by detecting mechanism that reports the secondary/back-up source presence. This transition takes place between NOPOWER and OFFBACK state. Valid back-up source inserted is performed as the second highest priority check (priority level 2).

High-temp or reference/source not valid transition—transition when high die temperature is detected, or, a state holding condition when primary source is not valid. The high-temp event can take place while system is in either ACTIVE, or HIBERNATE state. The target state is, however, always VALIDATE. High-temp or reference/source not valid has priority level three when multiple events are detected, and thus, multiple transitions are to happen.

A user start-up event transition—transition triggered on a user action. Typical user actions are: Pressing the unique button (ONKEY on the HHD keyboard)—or any point on the other human-interface device, plugging a charger device into HHD, or, plugging in an accessory device. Reacting on the detected event, VALIDATE state is entered and the Vpsys-, Vref-, and conditioning of temperature takes place. User start-up event gets captured in OFFPM, and brings the state-machine into VALIDATE state. This transition has priority order three in the OFFPM state.

Valid user start-up event transition—transition triggered after conditioning and validating a user event, when internal regulated supply is available, for example when a Vis-ok flag is set to indicate that Vis is available. Valid user start-up event, brings the state-machine into ACTIVE state. This transition has priority order four and five in VALIDATE and HIBERNATE, respectively.

Shut-down event transition—transition triggered either by the application software, application hardware, or by PM IC hardware (watchdog timer). It always gets captured in ACTIVE or HIBERNATE and leads the state-machine to OFFPM state. Priority order is 4—for ACTIVE, and 5 for HIBERNATE.

Go to Hibernate event transition—transition triggered for example by the application software. It gets captured in ACTIVE state and leads the state-machine to the HIBERNATE state. Priority order is 5. The Go to Hibernate event transition is generated for example when the application software (executed by the application processor) has no pending tasks left, or when it has received no new tasks have emerged during a predetermined time interval, or when no user actions have been detected in such a time interval. Alternatively a hardware timer may be used to trigger the Go to Hibernate event transition when such a time interval expires. In an embodiment the PM IC has one or more external terminals (not shown) for receiving requests to execute the Go to Hibernate event transition. The configuration data may comprise configuration bits that control whether a response to such signals is enabled. As an alternative the PM IC may be configured to respond to specific commands from the standard interface by executing the Go to Hibernate event transition.

As already mentioned before, an advanced—application-level RPS control is enabled while PM IC is in ACTIVE state. These system-level control algorithms make use of the RPS' supply voltage programmability, by means of configuration data in the active configuration memory. Another important issue for every RPS is the timing delay when an RPS is enabled or disabled. In an embodiment these delays are controlled by configuration data in the active configuration memory. This delay is a part of an improved control of RPSs that can be done in ACTIVE or HIBERNATE state by the PM IC itself. This last property is especially important for the system integrity during a start-up and shutdown transitions.

RPS configuration data defining properties like voltage level, timing delay, response to the direct-control signals etc., is stored in a configuration memory inside the PM IC. Configuration data is uploaded into PM IC when the PM IC is in the ACTIVE state. Until the upload has been performed, default configuration data is available. This default configuration data is stored in default configuration memory 21. The uploaded configuration data is stored in active configuration memory 23. From the flexibility point of view, configuration data has two parts: user-defined, and hard-wired data By uploading new data, user-defined configuration can be changed only, while hard-wired stays resident since it is concerning the RPSs that don't need to be programmed, i.e. have to be available permanently.

Figure 4:
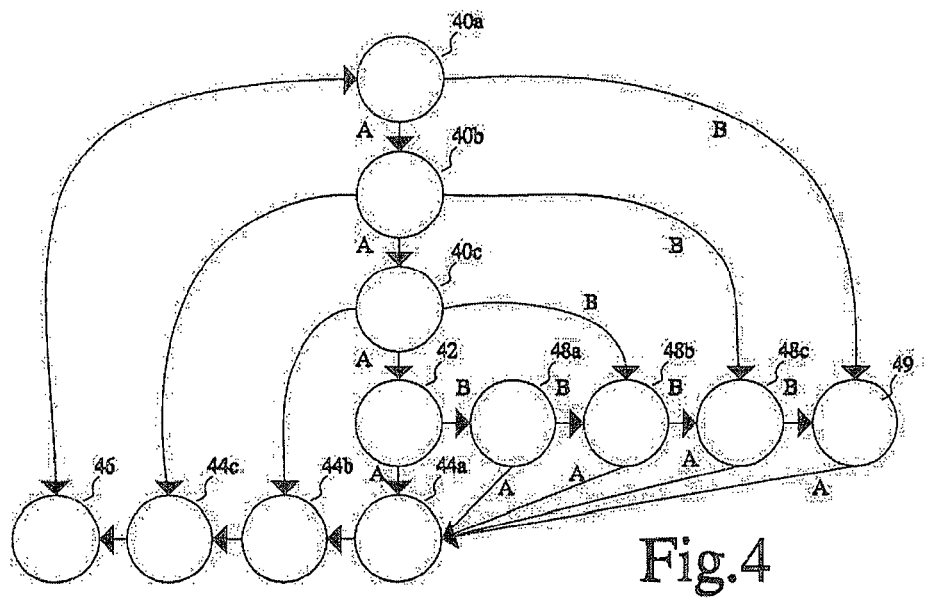

FIG. 4 shows states of the RPS control state-machine. The ACTIVE state 42, the OFFPM/VALIDATE state 46 and the HIBERNATE state 49 are shown. For the sake of clarity, OFFPM and VALIDATE state are depicted as one state 46. However, it can be considered that activation starts from VALIDATE, while every shutdown sequence ends with OFFPM. A series of delay states leading up to the ACTIVE state 42 are shown: ACT_DLY_1 40a, ACT_DLY_2 40b, ACT_DLY_3 40c. A series of delay states leading up to the OFFPM state 46 are shown: OFF_DLY_3 44a, OFF_DLY_2 44b, OFF_DLY_1 44c, OFFPM 46. Furthermore a series of delay states leading up to the HIBERNATE state 49 are shown: HIB_DLY_3 48a, HIB_DLY_2 48b, HIB_DLY_1 48c. These delay states correspond to a sequence of delays/phases, while every state defines an enable signal to be used for a configurable RPS control mechanism. Where different transitions are possible, priority levels of the transitions have been indicated by A and B (corresponding to priority levels 4 and 5 respectively). All the higher priority transitions (levels 1, 2 and 3), have been omitted for the sake of clarity.

In order to perform a reliable HHD system activation once when system is in OFFPM state 46, and also, in order to perform de-activation when system is either in ACTIVE or HIBERNATE state 49, both start-up and shutdown transitions do triggering a delay state sequence. States ACT_DLY_x, HIB_DLY_x and OFF_DLY_x represent unique delay interval defined by configuration data. In the example shown, between OFFPM and ACTIVE, ACTIVE and HIBERNATE, HIBERNATE and OFFPM, and HIBERNATE and ACTIVE, three delay are chosen by way of example. This makes possibility to have four transitional phases, given that first phase begins without delay, i.e. immediately when the originating event happens.

As the transitions have an assigned priority, the delay sequences can be overruling each other in the following way. The events with priority level 4 and 5, causing transitions between OFFPM to ACTIVE, and HIBERNATE to ACTIVE, respectively, can be overruled by the opposite events: Shut-down event and Go-hib event. This also means that, if Shut-down event or Go-hib event have happened, once started sequence of ACT_DLY_i will be immediately stopped and the opposite sequence (HIB_DLY_i-1, or OFF_DLY_i-1) will proceed. In addition, HIB_DLY_i sequence can be over-ruled by the Shut-down event taking over the OFF_DLY_i-1. Only OFF_DLY_x sequence can't be overruled by the events of priority four and five.

PRS control state-machine has assigned output phases to which every RPS-enable signal can be referenced.

Figure 5:
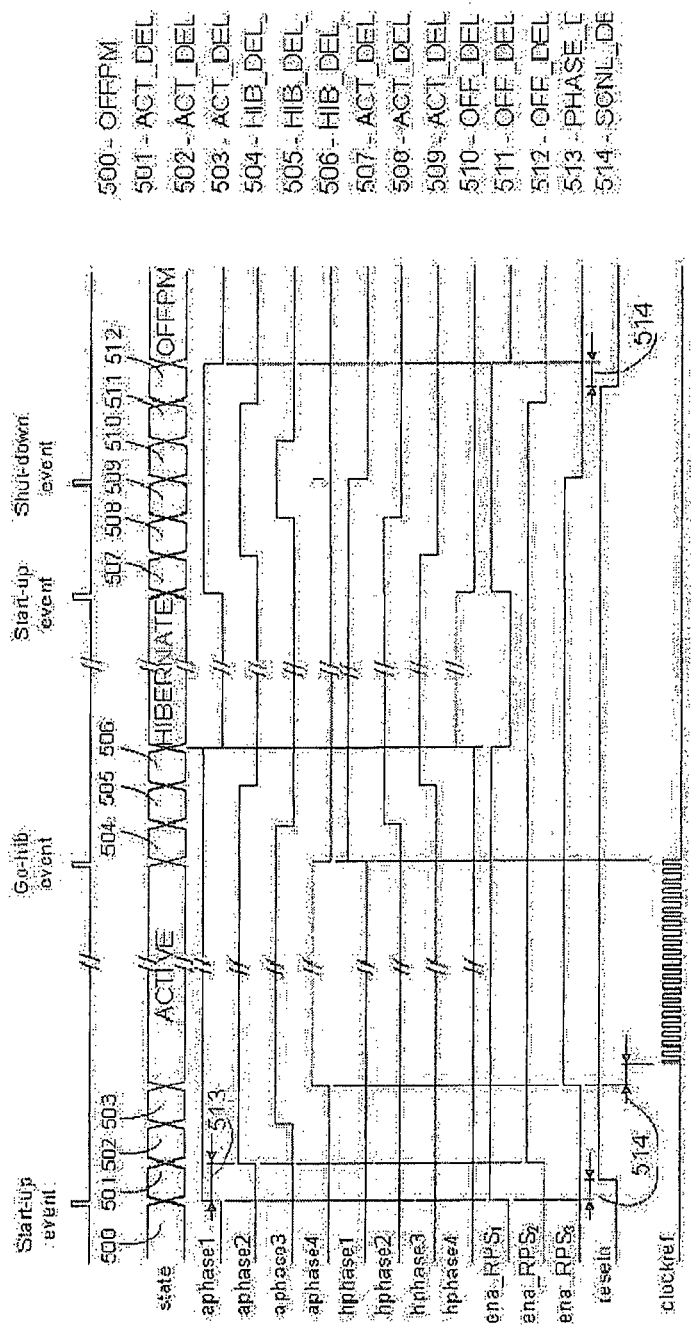

FIG. 5 shows a timing diagram and output phase timing. Sequences shown are driven by the following events: Valid-user start-up event, Go-hib event, Valid-user start-up event, and Shut-down event.

Figure 6:
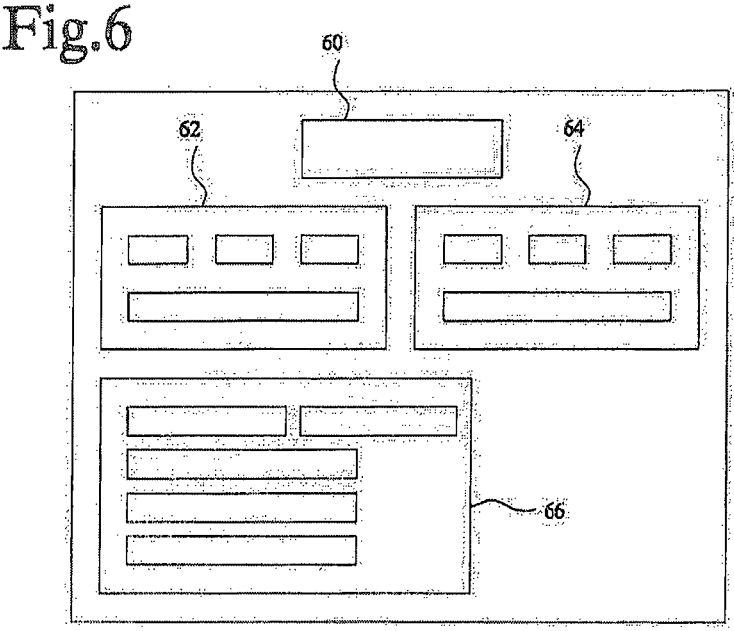

In FIG. 5, three enable signals are shown as well. The ena_PRS$_1$ is configured to be tied to the first activation phase and not to be enabled in HIBERNATE. The ena_RPS$_2$ is tied to the first delayed activation phase—aphase2, and also configured as allowed in HIBERNATE. Third RPS is tied to the activation phase delayed for three delay intervals, and also enabled in HIBERNATE. If assigned to activation phase i, an RPS will follow aphase$_i$, and hphase$_{last-i}$ FIG. 6 shows an example of a block of configuration data. The block contains a common part 60, an RPS phase control configuration sub-block 62, a reset and clock signal configuration sub-block 64 and a direct control configuration sub-block 66.

The RPS phase control configuration sub-block 62 fields for configuration data parameters phase and hib that defines the phase wherein an ena_PRSx signal must be generated, and defines status of the RPS in HIBERNATE state, respectively. In an embodiment four potential phases are used and therefore two-bit phase settings are used in the block of configuration data. An additional on-off control bit is provided in the RPS phase control configuration sub-block 62 to enable the RPS in ACTIVE state. Once set to '0', this bit overrules the phase sequence control over the ena_RPSx, i.e. switches off the RPS. Output voltage settings data may be provided in 7-bit configuration data fields, vout_dflt_sttngs.in the RPS phase control configuration sub-block 62. An RPS can be independently enabled and disabled by the on-off and hib bits in ACTIVE- and HIBERNATE only state, respectively. In an embodiment the parameters of this control configuration is are uploaded via the standard IO interface into the PMIC once when the HHD system is in ACTIVE state.

Similar configuration settings and assignment to phases can be provided in reset and clock signal configuration sub-block 64 for the other two functional signals that PM IC provides for the system: resetn- and clockref signals. To increase flexibility and integrity level even further, in place of vout_dflt_sttngs at RPSs, a field for another delay setting data may be added—sgnl_del. Next to the assigned phase and its delay, reset, and/or clock signal might be additionally delayed after the current phase is up, and it can be cancelled for the same amount of time before the currently assigned phase is down. Since appearance of a Shut-down event is unpredictable, applying sgnl_del is possible for all phases except the last. Example of clockref in FIG. 5 shows its assignments to phase 4, while not being enabled in HIBERNATE, clockref sees Go-hib event as a shutdown action.

In order to make a time-efficient control over the RPSs, a number of interface signals can be provided on a PM IC. Using these direct signals, a time-consuming communication through the standard interface can be minimized between the application processor and the PM IC. To accomplish direct control possibility, special activity mode of RPS may be defined, i.e. configuration mode settings may be uploaded into direct control configuration sub-block 66. Suggested direct control configuration is meant to be uploading via the standard IO interface once when the HHD system is in ACTIVE state.

To elaborate the concept, for simplicity reasons, let's presume that there are three direct control inputs on a PM IC, pwren$_i$, i=1.3. Those inputs are part of the application processor interface signals in FIG. 2. The application software that runs on the application processor controls an RPS via three general-purpose IO ports. In an embodiment an RPS comprises a voltage regulator with 7-bit voltage level settings data, vout_dflt_sttngs. At the moment when application requires RPS voltage change, it sets a mode field in direct control configuration sub-block 66 that vout is defined by one of three swap-register fields in direct control configuration sub-block 66, vout_swap_sttgs_x, (x=1, 2 or 3) and by one of the three provided trigger signals, pwren$_x$, x=1, . . . , 3. Table 2 shows the operation mode defined by five mode-setting bits.

TABLE 2

Mode definitions for direct control

| Mode | Description |
|---|---|
| xx000 | no swapping nor a direct control, do respect phase and the RPS on-off control bit |
| 00xx1 | change to the value defined by vout_swap_sttngs_1 triggered by pwren$_1$ input set 'high'; when pwren$_1$ input is 'low', value vout_dflt_sttngs is valid; (on-off = '1') |
| 00x10 | change to the value defined by vout_swap_sttngs_2 triggered by pwren$_2$ input set 'high'; when pwren$_2$ input is 'low', value vout_dflt_sttngs is valid; (on-off = '1') |
| 00100 | change to the value defined by vout_swap_sttngs_3 triggered by pwren$_3$ input set 'high'; when pwren$_3$ input is 'low', value vout_dflt_sttngs is valid; (on-off = '1') |
| 01xx1 | change to the value defined by vout_swap_sttngs_1 triggered by pwren$_1$ input set 'low'; when pwren$_1$ input is 'high', value vout_dflt_sttngs is valid; (on-off = '1') |
| 01x10 | change to the value defined by vout_swap_sttngs_2 triggered by pwren$_2$ input set 'low'; when pwren$_2$ input is 'high', value vout_dflt_sttngs is valid; (on-off = '1') |
| 01100 | change to the value defined by vout_swap_sttngs_3 triggered by pwren$_3$ input set 'low'; when pwren$_3$ input is 'high', value vout_dflt_sttngs is valid; (on-off = '1') |
| 10xx1 | change to the value defined by vout_swap_sttngs_1 triggered by pwren$_1$ input set 'high'; when pwren$_1$ input is 'low', the RPS is switched off |
| 10x10 | change to the value defined by vout_swap_sttngs_2 triggered by pwren$_2$ input set 'high'; when pwren$_2$ input is 'low', the RPS is switched off |
| 10100 | change to the value defined by vout_swap_sttngs_3 triggered by pwren$_3$ input set 'high'; when pwren$_3$ input is 'low', the RPS is switched off |
| 11xx1 | change to the value defined by vout_swap_sttngs_1 triggered by pwren$_1$ input set 'low'; when pwren$_1$ input is 'high', the RPS is switched off |
| 11x10 | change to the value defined by vout_swap_sttngs_2 triggered by pwren$_2$ input set 'low'; when pwren$_2$ input is 'high', the RPS is switched off |
| 11100 | change to the value defined by vout_swap_sttngs_3 triggered by pwren$_3$ input set 'low'; when pwren$_3$ input is 'high', value vout_dflt_sttngs is valid; (on-off = '1') |

The suggested mode definitions assume higher priority in swapping by pwren$_1$ related to pwren$_2$, and pwren$_2$ related to pwren$_3$, i.e. higher priority of vout_swap_sttngs_1 against vout_swap_sttngs_2 and vout_swap_sttngs_3. In all cases, a direct control mode assumes that the on-off configuration bit is set, and that phase associated has taken place. The MSB bit of the mode settings enables the additional switching off of the RPS, and when is set to '0' enables swapping between two vout levels, and when set '1', it performs additional switch off of the RPS.

Swapping between voltage levels is related to the values defined in the vout_swap_sttngs_x configuration register and the vout_dflt_sungs register. Optionally, change to the target value can be done in a number of steps, or instantaneously—depending on another configuration data, swap_steps. In Optionally direct control configuration sub-block 66 comprises a field for a configuration parameter, swap_step, which represents the number of steps in which output voltage changes from currently set value to the target voltage value. One step is defined by two parameters: Voltage magnitude corresponding to one LSB settings, Vstep, and Duration step unit as a basic step interval, Tstep. Typically, for a mobile-phone HHD, Vstep is 25 mV, while Tstep can be 8 us.

Configuration data inside a PM IC device is stored in registers in a domain supplied by Vis. As soon as this domain is gone, and OFFPM, NOPOWER, or OFFBACK state is entered, no active configuration data is kept anymore. In order to keep a default configuration that performs system integrity at a start-up event, a non-volatile, One-Time- or Multiple-Time Programmable memory (OTP/MTP) is used to store the default configuration. Before the PM IC is programmed for the first time, initial configuration default (reset) settings is defined by metal-mask, i.e. by routing to the local supply tie-off cell. These settings are valid as initial settings while digital circuitry is in reset conditions. Also, having programmed OTP/MTP memory with new default settings, these have to be available to the digital circuitry before reset is released. Therefore, on the transition from VALIDATE to ACTIVE, i.e. after the reference/supply validation has passed, the OTP/MTP data gets latched and, is kept inside the Vis domain for further use. The time point of data latching moment should precede the internal reset pulse release, making this way the last time programmed OTP/MTP settings available for the start-up sequence- and direct control. The latching signal, LtchNvm, may be generated by a delay block, DLY (not shown).

Once powered and active, the HDDs application software should be aware of the system power supply status and history. Important supply status data is stored in Vis domain and available on request via the standard interface. However, supply status history, since concerning also discontinuity of supplies, has to be stored in the power domain that is available as first and as last between inserting and removing either primary or secondary supply source. This domain is Vrtc. Therefore, next to the real-time-clock function, the Vrtc supplies also logic that holds Vpsys status bit, uvln, that reports an "under-voltage lock-up situation" appeared between two status-checking (reading) actions. This bit gets set to '1' when Vpsys is removed, and gets cleared when a reading action upon his Vpsys mirror-register is performed. Another important status bit, npwr, that reports complete power removal, i.e. NOPOWER state between two reading actions, is stored in Visys domain. This bit is set to '1' when Visys appears after NOPOWER state. When his Vis-supplied mirror register is read, this bit gets cleared. Third status bit to be saved in Vrtc domain is an indicator of the high-temperature event/situation caused last OFFPM state. It is set when die-temperature exceeds a hard-safety limit and state-machine enters the OFFPM state. This bit gets cleared after reading its Vis-domain mirror register—next time when PM IC is back in ACTIVE.

Three mentioned status bits, reporting internal power-error conditions, and the die overheating, point to a situation within the HHD when integrity of the whole system needs to be inspected with a special care by software. This is due to the fact that the highest-level priority event has happened meanwhile, i.e. the primary supply source was removed, the power supply inside the PM IC was removed, or something caused unexpected overheating, these status bits can be called error flags. To grant integrity for the next activity session, some or all HHD functions might be tested depending on the error flags status.

As already mentioned in the OFFBACK state, when a secondary energy source is available only, the Vrtc supply domain can be supplied by it. There is also a use-case when the Vrtc supplied circuits, like real-time clock (RTC in FIG. 2), or error flags (RAMin FIG. 2), don't need to be supplied although the secondary energy source, Vback, is available. This is true for example in the final HHD test phase and before the product is delivered to the market, when a charged secondary source (golden-cap, or coin-cell-like battery) is inserted, and needs to keep its energy before the HHD is provided with the main battery source and switched-on for the first time. This may take even some months.

In order to condition NOPOWER to switching to the OFF-BACK state therefore, preferably an additional switching mechanism (e.g. in the form of dedicated hardwired or programmed circuits) is provided in the Vrtc input supply selection circuit. Preferably, this mechanism is arranged to operate under control of configuration data. By default, the configuration data makes sure that the secondary/back-up source battery doesn't supply Vrtc once it is inserted in the system that was in NOPOWER state. As a consequence, system remains in NOPOWER state as long as a good primary/main source in not inserted. When the main source is plugged, PM IC detects Visys but also Vrtc is created. With the next start-up event, PM IC enters ACTIVE state and, among the other tasks, the application boot-up routine has to activate two mechanisms within the PM IC: Enable Vback selection for Vrtc, and, enable Vback charging by Vbat—if the main battery was inserted.

In an embodiment, the activation of RTC in the OFFBACK state is dependent on the configuration data in the active configuration memory. Dependent on the configuration data the Vrtc supply domain is supplied from the secondary energy source in the OFFBACK state or not. Similar, configurable selections of energy use from the secondary battery for other functions may be controlled by the configuration data as well.

Figure 7:
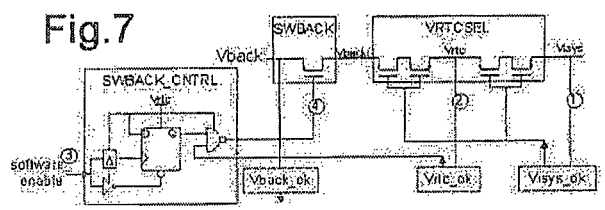

FIG. 7 shows a concept scheme of the Vrtc selection circuit referred to as VRTC_SEL in the context of FIG. 2. The Vrtc selection circuit comprises a circuit SWBACK_CNTRL that, based on a rising edge of the software controlled signal software_enable, latches the internal SWBACK switch into the position that provides Vbacki voltage for the Vrtc supply selector VRTCSEL. Situated in Vrtc domain, SWBACK_CNTRL contains a flip-flop that is with an undefined output if Vrtc is not available (before 2). This status remains the same until a dedicated bit in Vis domain is set by software (3). Then is the flip-flop reset first, and after an applied delay, a logical 'high' is clocked into it. This make the NAND gate to generate 'low' (4) which closes the SWBACK switch. Vbacki will be available supplied by Vback as long as Vrtc monitor, Vrtc_ok, is reporting correct status. Whenever is Visys supply removed, the VRTC_SEL block selects Vbacki for the Vrtc source. This way is Vrtc kept supplied by Vback when Visys is removed and the real-time clock and the error flags remain maintained correctly. Numbering in the Figure shows the order of appearance of the supply/signal, while Vback_ok, Vrtc_ok and Visys_ok blocks are meant to monitor voltage of certain supply domain and generate status and/or local selection signals.

Suggested strategy for a very-low power management is implemented in a PM IC chip that is a counterpart of an HHD system. PM IC control state-machine (FIG. 3), together with a basic-phase controlled RPS configuration data (FIG. 6) is the basics of the strategy. With an internal power-domain division as suggested (FIG. 2), further significant progress in implementing PM IC power management strategy is possible. Optionally, on top of the PM IC control state machine, the RPS control state-machine (FIG. 5) can be implemented—together with the extended-direct controlled configuration data (FIG. 6). Directly controlled RPSs by dedicated PM IC inputs increase flexibility and make possible implementation of other—more advanced system-level algorithms. Direct control of RPSs is configured by the suggested mode of operation (Table 2). HDD system integrity is granted if correct configuration is properly maintained in the internal PM IC power domains. Also, three suggested error flags reporting primary source power status or temperature-related irregular situation happened in history, could increase certainty and integrity level checks performed by the HHD software. At last, from a back-up battery insertion in the HHD assembly phase, and before a user switches the HHD for the first time, it can take a while. In order to save the injected energy as much as possible, the back-up battery source is made selectable as a power source after a software request only (FIG. 7). Suggested strategy may be used completely or partly-combined in different power management solutions. Proposed complete strategy is going to be implemented as an IC. The main state-machine, power-domain concept, back-up battery conservation method, and partly configuration management (NVM part), can be implemented using analogue design approach. The RPS control state-machine, and active configuration management are suitable for digital design implementation. The target PM IC can be potentially used in all hand-held devices supplied by batteries. Basic requirements for those HHDs are: a human-interface (typing or pointing device interface), and a standard programming interface on this processor-based system side. Optionally, higher-level power management software can be involved as well. This invention can be extensively used in 3G mobile phones, PDAs, and gaming devices.

While the invention has been illustrated and described in detail in the drawings and foregoing description, such illustration and description are to be considered illustrative or exemplary and not restrictive; the invention is not limited to the disclosed embodiments.

For example, it should be appreciated that uploadable configuration data could be combined with other types of power domain stacking. The active configuration memory may be powered partly or wholly from another domain than Vis, so that the active configuration memory or parts of it may be available also in states wherein Vis is not available. Furthermore, it should be realized that the description in terms of a state machine and various states is first of all descriptive. In practice such a state machine can be implicit in a computer program that controls operation of the PM IC, in the sense that the states may be defined by points reached in computer program and/or the value of operand data used by the computer program that also (and primarily) has other functions.

Alternatively an explicit state machine may be used, for example in terms of a computer program that uses operand data that only represents the state, or in terms of a state machine architecture, using a memory to store an identification of the current state and a circuit to compute a next states as a function of the current state and signal data. This has the advantage that a clearly defined response to configuration data can be provided.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A power management integrated circuit, comprising:
   a power supply input terminal;
   a plurality of power supply output terminals;
   a plurality of power source circuits coupled between the power supply input terminal and respective ones of the power supply output terminals;
   an active configuration memory;
   a communication interface with at least one terminal for uploading configuration data from outside the power management integrated circuit into the configuration memory;
   a plurality of direct power control terminals to receive trigger signals;
   a control circuit configured to control, responsive to the trigger signals from the direct power control terminals, timing delays between switch off and/or switch on of respective ones of the power source circuits dependent on the configuration data from the active configuration memory, wherein the timing delays are controlled based on a delay sequence specified in a Regulated Power Source (RPS) control state machine.

2. A power management integrated circuit according to claim 1, comprising a default configuration memory, the control circuit being configured to control operating parameters of respective ones of the power source circuits dependent on default data from the default configuration memory at least until the configuration data has been loaded into the active configuration memory after start-up of the power management integrated circuit.

3. A power management integrated circuit according to claim 1, comprising a hierarchy of power supply domains, each particular power supply domain being activatable only if a hierarchically higher one of the power domains that stands above the particular power supply domain has been activated.

4. A power management integrated circuit according to claim 3, configured to operate as the RPS control state machine with states that include at least:
   a no power state wherein the power management integrated circuit is not supplied by any supply source;
   a first off state wherein a primary source voltage has been detected, and wherein only a part of the power management integrated circuit is activated;
   a second off state wherein a secondary source voltage has been detected;
   a validate state wherein validate primary internal parameters are validated;
   an active state wherein externally selectable activity is possible; and
   a hibernate state wherein the power management integrated circuit is switched to a configurable low-power profile by providing power only a selected part of the power supply output terminals.

5. A power management integrated circuit according to claim 1, configured to switch from an active state to a hibernate state, the configuration data controlling which of the power supply output terminals supply power in the hibernate state and which not.

6. A power management integrated circuit according to claim 1, wherein the power supply input terminal is provided for receiving power from a primary supply source, the power management integrated circuit having a further power supply input terminal for receiving power from a secondary supply source, the power management integrated circuit being configured to switch to a backup state upon detection of disconnection of the primary power source, the configuration data controlling which part of the power management integrated circuit and/or the power supply output terminals receive power from the secondary supply source in the backup state.

7. An apparatus comprising a power management integrated circuit according to claim 1, a plurality of further circuits, coupled to respective ones of the power supply output terminals and an application processor coupled to the communication interface, wherein the application processor is configured to upload the configuration data to the active configuration memory through the communication interface.

8. A method of operating an apparatus comprising an application processor and a plurality of circuits, wherein the circuits of the plurality of circuits have power supply inputs coupled to power supply output terminals of a power supply management integrated circuit, the method comprising:
   uploading configuration data from the application processor to an active configuration memory in the power supply management integrated circuit;
   receiving trigger signals from one or more direct power control terminals;
   controlling, responsive to the trigger signals from the direct power control terminals, timing delays between switch off and/or switch on of respective ones of the power source circuits dependent on the configuration data from the active configuration memory and on a delay sequence specified in a Regulated Power Source (PRS) control state machine.

9. A power management integrated circuit, comprising:
   a power supply input terminal;
   a plurality of power supply output terminals;
   a plurality of power source circuits coupled between the power supply input terminal and respective ones of the power supply output terminals;
   an active configuration memory;
   a communication interface with at least one terminal for uploading configuration data from outside the power management integrated circuit into the configuration memory;
   a plurality of direct power control terminals to receive trigger signals;
   a control circuit configured to control, responsive to the trigger signals from the direct power control terminals, a combination of power source circuits that will be switched off and/or switched on dependent on the configuration data from the active configuration memory and on a delay sequence specified in a Regulated Power Source (RPS) control state machine.

10. A power management integrated circuit according to claim 9, comprising a default configuration memory, the control circuit being configured to control operating parameters of respective ones of the power source circuits dependent on default data from the default configuration memory at least until the configuration data has been loaded into the active configuration memory after start-up of the power management integrated circuit.

11. A power management integrated circuit according to claim 9, comprising a hierarchy of power supply domains, each particular power supply domain being activatable only if a hierarchically higher one of the power domains that stands above the particular power supply domain has been activated.

12. A power management integrated circuit according to claim 11, configured to operate as the RPS control state machine with states that include at least:
- a no power state wherein the power management integrated circuit is not supplied by any supply source;
- a first off state wherein a primary source voltage has been detected, and wherein only a part of the power management integrated circuit is activated;
- a second off state wherein a secondary source voltage has been detected;
- a validate state wherein validate primary internal parameters are validated;
- an active state wherein externally selectable activity is possible; and
- a hibernate state wherein the power management integrated circuit is switched to a configurable low-power profile by providing power only a selected part of the power supply output terminals.

13. A power management integrated circuit according to claim 9,
configured to switch from an active state to a hibernate state, the configuration data controlling which of the power supply output terminals supply power in the hibernate state and which not.

14. A power management integrated circuit according to claim 9, wherein the power supply input terminal is provided for receiving power from a primary supply source, the power management integrated circuit having a further power supply input terminal for receiving power from a secondary supply source, the power management integrated circuit being configured to switch to a backup state upon detection of disconnection of the primary power source, the configuration data controlling which part of the power management integrated circuit and/or the power supply output terminals receive power from the secondary supply source in the backup state.

15. An apparatus comprising a power management integrated circuit according to claim 9, a plurality of further circuits, coupled to respective ones of the power supply output terminals and an application processor coupled to the communication interface, wherein the application processor is configured to upload the configuration data to the active configuration memory through the communication interface.

16. A method of operating an apparatus comprising an application processor and a plurality of circuits, wherein the circuits of the plurality of circuits have power supply inputs coupled to power supply output terminals of a power supply management integrated circuit, the method comprising:
- uploading configuration data from the application processor to an active configuration memory in the power supply management integrated circuit;
- receiving trigger signals from one or more direct power control terminals;
- controlling, responsive to the trigger signals from the direct power control terminals, timing delays between switch off and/or switch on of respective power source circuits dependent on the configuration data from the active configuration memory, wherein the timing delays are controlled based on a delay sequence specified in a Regulated Power Source (RPS) control state machine.

\* \* \* \* \*